United States Patent
Teitelbaum et al.

[11] Patent Number: 5,839,293
[45] Date of Patent: Nov. 24, 1998

[54] PROVISION OF CONDITIONED AIR TO A TRUNK OF A VEHICLE

[76] Inventors: Neil Teitelbaum, 834 Colonel By Drive, Ottawa, Ontario, Canada, K1S 5C4; Gordon Freedman, 41 Elvaston Avenue, Nepean, Ontario, Canada, K2G 3Y1

[21] Appl. No.: 896,171

[22] Filed: Jul. 17, 1997

[51] Int. Cl.⁶ .................... B60H 1/32; B60P 3/20
[52] U.S. Cl. .................. 62/244; 454/143; 454/144; 454/156
[58] Field of Search .............. 62/244; 454/141, 454/143, 144, 156, 159

[56] References Cited

U.S. PATENT DOCUMENTS

| | | | |
|---|---|---|---|
| 2,902,838 | 9/1959 | Nichols | 454/156 X |
| 2,915,885 | 12/1959 | Reagan | 62/244 X |
| 4,172,494 | 10/1979 | Saulters | 62/244 X |
| 4,376,408 | 3/1983 | Iijima et al. | 454/156 X |
| 4,936,103 | 6/1990 | Newman | 62/244 X |
| 5,203,833 | 4/1993 | Howell | 62/244 X |
| 5,355,694 | 10/1994 | Morrow et al. | 62/244 |
| 5,588,480 | 12/1996 | Armanno, Sr. | 62/244 X |

FOREIGN PATENT DOCUMENTS

| | | | |
|---|---|---|---|
| 458173 | 7/1949 | Canada | 454/131 |
| 60-236822 | 11/1985 | Japan | 454/141 |
| 63-287622 | 11/1988 | Japan | 454/156 |
| 1 582 440 | 1/1981 | United Kingdom | 454/141 |

*Primary Examiner*—Harold Joyce
*Attorney, Agent, or Firm*—Neil Teitelbaum & Associates

[57] ABSTRACT

An air distribution system for conditioning air and selectably forcing the air into a passenger compartment or a trunk compartment of a vehicle is provided. The air may be pre-cooled or pre-heated before being forced by a ventilator to particular vents. This is particularly useful on a warm day when the top is down on a convertible. By cooling the trunk, specifically, groceries or perishables can be kept relatively cool.

14 Claims, 2 Drawing Sheets

PROVISION OF CONDITIONED AIR TO A TRUNK OF A VEHICLE

FIELD OF THE INVENTION

This invention relates generally to the provision of conditioned warm or cold air to the trunk compartment of vehicles such as automobiles and the like.

BACKGROUND OF THE INVENTION

Air conditioning systems for use in automobiles are well known. One system describing an air distribution system for air conditioning or heating is described in PCT international patent application WO 91/06441 in the name of THE 2500 CORPORATION of the United States. Canadian Patent 2,193,351 discloses an air conditioner for cooling or heating partitions zones of an interior of a vehicle; And, U.S. Pat. No. 5,350,335 in the name of Andersson assigned to Saab Automobile Aktiebolag of Sweden describes a ventilation system for a vehicle, incorporated herein by reference, that is capable of carrying heated or cooled air to locations within the vehicle.

One limitation of these and other known air conditioning systems is that while they provide means of directing warm or cooled air within the interior passenger compartment for the occupants of the vehicle, they do not provide means of directing warm or cool air into a trunk compartment to cool the contents thereof.

It is a well known fact, that shopping trips are hastily foreshortened or ended to ensure that perishables or frozen foodstuffs subject to thawing or spoiling within a warm vehicle or more specifically within warm trunk of a vehicle are placed in a refrigerator.

However. this is not always the case; when there is cooled space within an air conditioned passenger compartment to place these foodstuffs this problem may be obviated or at least lessened. Nevertheless, when the vehicle is a convertible and the top is down on a hot summer day, the choice of where to place frozen groceries is limited to the open car, or usually a very warm trunk, where temperatures can exceed 35 degrees C.

Thus it is an object of this invention, to provide an inexpensive means of cooling a trunk space of an automobile, by using cool air from an air conditioning device that would otherwise be provided to cooling the passenger compartment of the vehicle.

It is an object of the invention, to provide a ventilation system for providing forced air selectively providing air to a trunk compartment of a convertible vehicle, while not expelling air within the open passenger compartment.

SUMMARY OF THE INVENTION

In accordance with the invention, there is provided, a ventilation distributing system for selectively distributing ventilation to a passenger compartment and a trunk compartment of vehicle, comprising:

a ventilator unit for providing forced air to one or more outlet ports;

a first conduit having an inlet port coupled to at least one of the outlet ports of the ventilator, said first conduit having an opening for expelling air into the passenger compartment;

a second conduit coupled to one of the first conduit and the one or more outlet ports for receiving forced air therefrom and for directing expelling air into the trunk compartment.

In accordance with the invention, there is further provided, a ventilation distributing system comprising means for selectively switching forced air provided by a ventilator to a trunk compartment of a vehicle while substantially preventing airflow from said ventilator to the passenger compartment.

BRIEF DESCRIPTION OF THE DRAWINGS

Exemplary embodiments of the drawings will now be described in accordance with the drawings in which.

DETAILED DESCRIPTION

Figure 1:
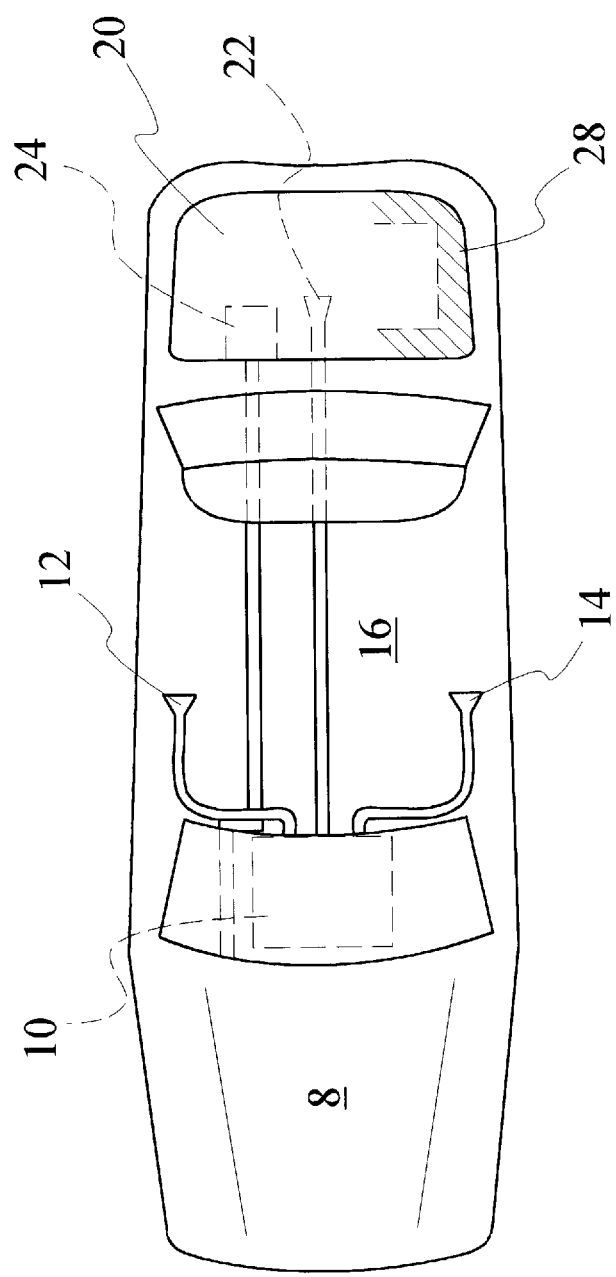
FIG. 1 is a diagrammatic view of a convertible automobile shown with the top down and shown with the seats and other extraneous hardware removed to more clearly illustrate the invention.
Figure 2:
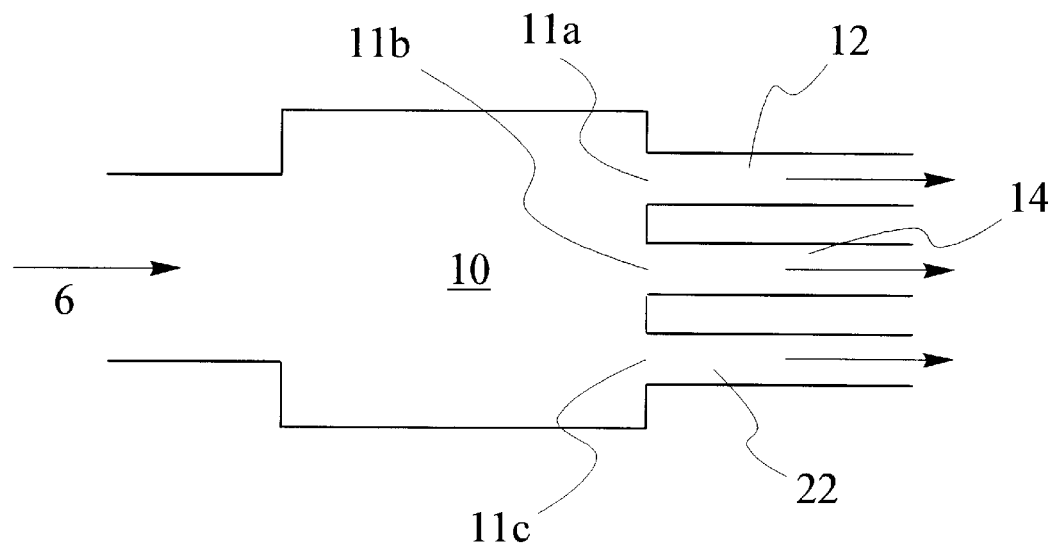
FIG. 2 is a block diagram of a ventilator configured in accordance with the invention; and, FIG. 3 is a block diagram of a two port ventilator having means for directing airflow through only one port at a time.

Referring now to FIGS. 1 and 2, a convertible automobile is shown with the top in the down position to more clearly illustrate air conduits 12, 14 for providing forced air to the passenger compartment 16, and air conduit 22 for providing force air to the trunk compartment 20 of the vehicle. A ventilator 10 disposed at the front of the passenger compartment 16 is comprised of a housed fan for drawing air from an inlet port 6 for carrying the air to three ports 11a, 11b, and 11c. The ventilator multiplexes the air to ports 11a, 11b, or 11c by dampers that are controlled in a known manner, to open and close the ports 11a, 11b and 11c as desired. Of course other gate or valve means that are electronically or hydraulically controlled may be used to open and close the ports.

Figure 3:
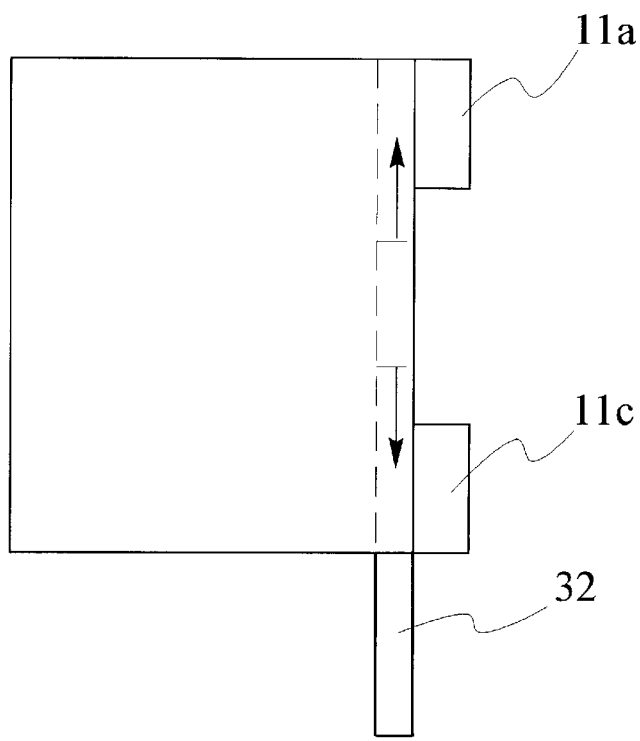

Alternatively, in FIG. 3 means are shown in the form of a sliding member 32 having a single opening therein that can be positioned in front of only one of the two openings at a time. Positioning the member so that its opening is adjacent one of the ports 11a and 11c, ensures that only one port can be opened at a time. In effect this ensures that only the trunk or the passenger compartment will receive forced air. The system as shown in FIGS. 1 to 3 can be used to port warm or cold air, as may be required, to the trunk compartment.

In another embodiment, a sensor 24 is disposed within the trunk for sensing an ambient temperature within the trunk. The heating or cooling system is engaged in dependence upon a sensed temperature that is above or below a predetermined threshold. Since a driver of a vehicle is incapable of assessing the temperature in the trunk while driving, the sensor provides feedback in the form of a temperature reading to assist the driver in controlling the system. Alternatively, an automatic climate control system incorporates a sensor for sensing temperature in the trunk. Automatic climate control systems are well known for use in homes, buildings, and luxury automobiles.

For example, in a luxury automobile, it is common to enter a desired cabin temperature and to ignore the ventilation system. The automatic climate control system increases cooling or heating as required to achieve the desired temperature within the cabin of the car. Once achieved, the system idles until a temperature fluctuation occurs. According to the invention, a desired temperature is entered for the trunk as well as for the cabin. The automatic temperature control system routes air that has been cooled or heated to the cabin and to the trunk until the desired temperatures are reached within each separate compartment. Once the temperatures are achieved, the system idles until a change in temperature in either the trunk or the cabin is detected. Of course, during idling the system may perform any of a number of functions such as venting, recirculating, blowing, etc.

Of course numerous other embodiments may be envisaged without departing from the spirit and scope of the invention.

For example, the trunk lid, sides, back, and/or base may be thermally insulated in order to provide some isolation from the ambient air outside the vehicle. Insulation is indicated by cross-hatching at numeral 28.

What I claim is:

1. A ventilation distributing system for selectively distributing ventilation to a passenger compartment and/or a trunk compartment of vehicle, comprising:

a ventilator unit for providing forced air to one or more outlet ports;

a first conduit having an inlet port coupled to at least one of the outlet ports of the ventilator, said first conduit having an opening for expelling air into the passenger compartment;

a second conduit coupled to the one or more outlet ports for receiving forced air therefrom and for expelling air into the trunk compartment.

2. A ventilation distributing system as defined in claim 1, comprising means for selectively allowing or disallowing forced air provided by the ventilator to flow to the trunk through the second conduit while providing air to the passenger compartment.

3. A ventilation distributing system as defined in claim 1, comprising means for selectively allowing or disallowing forced air provided by the ventilator to flow to the trunk through the second conduit while substantially preventing airflow to the passenger compartment.

4. A ventilation distributing system comprising means for selectively allowing or disallowing forced air provided by a ventilator to flow to a trunk compartment of a vehicle while substantially preventing airflow from said ventilator to the passenger compartment.

5. A ventilation distributing system comprising means for selectively allowing or disallowing forced air provided by a ventilator to be directed into a trunk compartment of a vehicle or to a separate passenger compartment of said vehicle.

6. A ventilation distributing system as defined in claim 5, including conduits for directing said air into the trunk compartment and into the passenger compartment of the vehicle.

7. A ventilation distributing system as defined in claim 6, including means coupled to the ventilator for pre-heating or pre-cooling the air.

8. An air distribution system as defined in claim 7, comprising a temperature sensor for sensing temperature in the trunk.

9. In an automobile having a passenger compartment and a trunk compartment, an air distribution system having at least a conduit coupled to a ventilator for ventilating the passenger compartment, and a conduit coupled to the ventilator for ventilating the trunk compartment, and means for selectively directing air from the ventilator to at least one of the trunk and the passenger compartment.

10. An air distribution system as defined in claim 9, wherein the means for selectively directing air includes means for directing air to only one of said trunk and said passenger compartment.

11. An air distribution system as defined in claim 9, including means for pre-heating and/or pre-cooling said air prior to ventilating.

12. An air distribution system as defined in claim 11, wherein the trunk includes thermal insulation means.

13. An air distribution system as defined in claim 11, comprising a temperature sensor for sensing temperature in the trunk.

14. An air distribution system as defined in claim 9, wherein the automobile is a convertible.

\* \* \* \* \*